(12) United States Patent
Muhammad

(10) Patent No.: US 8,792,831 B2
(45) Date of Patent: *Jul. 29, 2014

(54) WIRELESS COMMUNICATIONS DEVICE WITH PERFORMANCE MONITORING AND ASSOCIATED METHODS

(75) Inventor: Khurram Muhammad, Garland, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 367 days.

This patent is subject to a terminal disclaimer.

(21) Appl. No.: 13/225,762

(22) Filed: Sep. 6, 2011

(65) Prior Publication Data

US 2013/0058387 A1 Mar. 7, 2013

(51) Int. Cl.
  *H04B 1/00* (2006.01)
  *H04B 7/14* (2006.01)
(52) U.S. Cl.
  USPC .......................................... 455/63.1; 455/24
(58) Field of Classification Search
  USPC ............ 455/19, 24, 115.1, 115.4, 233.1, 255,
  455/75, 114.3, 61.3, 69, 82
  See application file for complete search history.

(56) References Cited

U.S. PATENT DOCUMENTS

| 7,782,928 | B2 | 8/2010 | Kang et al. | 375/221 |
| 7,856,048 | B1 * | 12/2010 | Smaini et al. | 375/221 |
| 7,965,988 | B2 * | 6/2011 | Cole et al. | 455/73 |
| 2001/0049264 | A1 * | 12/2001 | Balech | 455/69 |
| 2003/0045249 | A1 | 3/2003 | Nielsen | |
| 2006/0050810 | A1 | 3/2006 | Haque et al. | |
| 2008/0144709 | A1 * | 6/2008 | McCallister et al. | 375/233 |
| 2008/0166985 | A1 * | 7/2008 | Wortel et al. | 455/233.1 |
| 2009/0262861 | A1 | 10/2009 | Nielsen | 375/396 |
| 2010/0026395 | A1 | 2/2010 | Lane | 331/15 |

FOREIGN PATENT DOCUMENTS

WO  2007005505  1/2007

OTHER PUBLICATIONS

Debaillie et al. "*Calibration of Direct-Conversion Transceiver*" IEEE Journal of Selected Topices in Signal Processing, vol. 3, No. 3, Jun. 2009.
Debaillie at al. "*Calibration of SDR circuit imperfections*" IEEE Xplore; Downloaded Jan. 6, 2010.

* cited by examiner

*Primary Examiner* — Yuwen Pan
*Assistant Examiner* — Xin Jia
(74) *Attorney, Agent, or Firm* — Allen, Dyer, Doppelt, Milbrath & Gilchrist, P.A.

(57) ABSTRACT

A mobile wireless communications device includes a transceiver comprising a transmitter and a receiver, an auxiliary receiver, and a controller. The transmitter is configured to upconvert a transmit baseband modulated signal and generate an RF modulated signal having a transmit impairment. The auxiliary receiver is configured to downconvert the RF modulated signal and generate a receive baseband modulated signal having the transmit impairment. The auxiliary receiver is selectively configured to operate based on a control signal in a single-mixer mode when the transmitter is selectively configured to operate in a dual-mixer mode, and in the dual-mixer mode when the transmitter is selectively configured to operate in the single-mixer mode. The controller is configured to compare the transmit baseband modulated signal to the transmit impairment to determine an error difference therebetween, and generate the control signal based on the error difference.

26 Claims, 11 Drawing Sheets

WIRELESS COMMUNICATIONS DEVICE WITH PERFORMANCE MONITORING AND ASSOCIATED METHODS

TECHNICAL FIELD

The present disclosure relates to the field of wireless communications, and more particularly, to performance monitoring and tuning of a transceiver in a wireless communications device.

BACKGROUND

In general, undesired or non-ideal characteristics, such as DC offset and in-phase/quadrature-phase (IQ) imbalance, degrade performance of mobile transceivers. The DC offset is the effect of self mixing by a mixer, and occurs when a signal of a local oscillator (LO) returns after leaking toward an antenna or when a radio frequency (RF) modulation signal input through the antenna is leaked to the local oscillator. Another way to create DC offset is through an inherent offset in the amplifiers due to imbalances. If the DC offset is amplified by amplifiers in the signal path, then this way may saturate a baseband circuit.

The IQ imbalance is caused when the phase difference between the in-phase (I) channel signal and the quadrature-phase (Q) channel signal generated in an oscillator of a wireless transmitter is not 90 degrees. The IQ imbalance can be reduced by designing mixers of the I channel demodulator and the Q channel demodulator to be precisely 90 degrees in phase delay (i.e., orthogonal) to each other. However, designing the mixers so that there is precisely a 90 degrees phase difference to each other is not practical over process and temperature variations. This is because in the layout, the I and Q paths to the mixers traverse different lengths despite the best effort of keeping everything symmetrical. This is especially true for multi-band systems. An IQ imbalance increases the Bit Error Rate (BER), thereby degrading the performance of the wireless transceiver.

One approach for compensating DC offset and IQ imbalance between orthogonal signals within in a mobile wireless communications device is disclosed in U.S. Pat. No. 7,782, 928. The communications device includes a transmitter that functions as a signal generator, and a receiver that functions as a response characteristic detector. A baseband processor applies predefined test signals to the transmitter, receives the test signals returning from the receiver, and compensates the imbalance and DC offset for the transmitter side and the receiver side by using the test signals.

Another approach for compensating DC offset and IQ imbalance between orthogonal signals within in a mobile wireless communications device is disclosed in U.S. Published Patent Application No. 2009/0262861. A baseband processor generates an I baseband signal and a Q baseband signal. A direct up-converter is coupled to the baseband processor, and combines the I and Q baseband signals with an RF carrier signal to generate an RF output signal. The antenna is coupled to the direct up-converter, and transmits the RF output signal. An impairment detection and compensation feedback circuit is coupled to the RF output signal, and the I and Q baseband signals. The impairment detection and compensation feedback circuit down-converts the RF output signal to generate an intermediate frequency (IF) signal, measures as least one signal impairment in the IF signal, and pre-distorts the I and Q baseband signals to compensate for the measured signal impairment.

Yet another approach is disclosed in the article titled "Calibration of Direct-Conversion Transceivers" by Debaille, IEEE Journal of Selected Topics in Signal Processing, Volume 3, No. 3, June 2009. To enable separation of the impairments caused by the transmitter and the receiver, their local oscillators are operated at slightly different frequencies. Compensation is then based on using a dual-tone calibration signal, such as a standard compliant OFDM modulated preamble, wherein a multi-tone symbol travels through a transceiver configured in loop-back. The compensation is performed by pre- and post-compensating the baseband signal of the transmitter and receiver respectively.

Even in view of the above approaches for compensating DC offset and IQ imbalance between orthogonal signals within in a mobile wireless communications device, there is still a need to improve such compensation. A drawback of the above approaches is that data cannot be transmitted by the transmitter when being compensated.

In addition, functional testing of a transceiver is useful to quickly assess that all components of the device are functional. A next level of test may be performed to determine performance of the device. This normally requires external equipment for generating signal sources and for measuring the output.

U.S. published patent no. 2007/0009021 discloses performance monitoring and tuning of a transceiver in a wireless communications device. Complementary cumulative distribution function (CCDF) curves are produced for received test data packet signals, and used to measure transmitter compression level to which an error vector magnitude (EVM) is correlated. By measuring compression levels to estimate correlated EVM values, instead of measuring EVM directly, iterative adjustments in the output power level can be made to bring the transmitter EVM close to a desired target EVM for a more optimal transmitter performance. Similar to the above compensation approaches, dedicated test signals are required. Consequently, a drawback of this approach is that data cannot be transmitted by the transmitter when being performance monitored.

DETAILED DESCRIPTION

Figure 1:
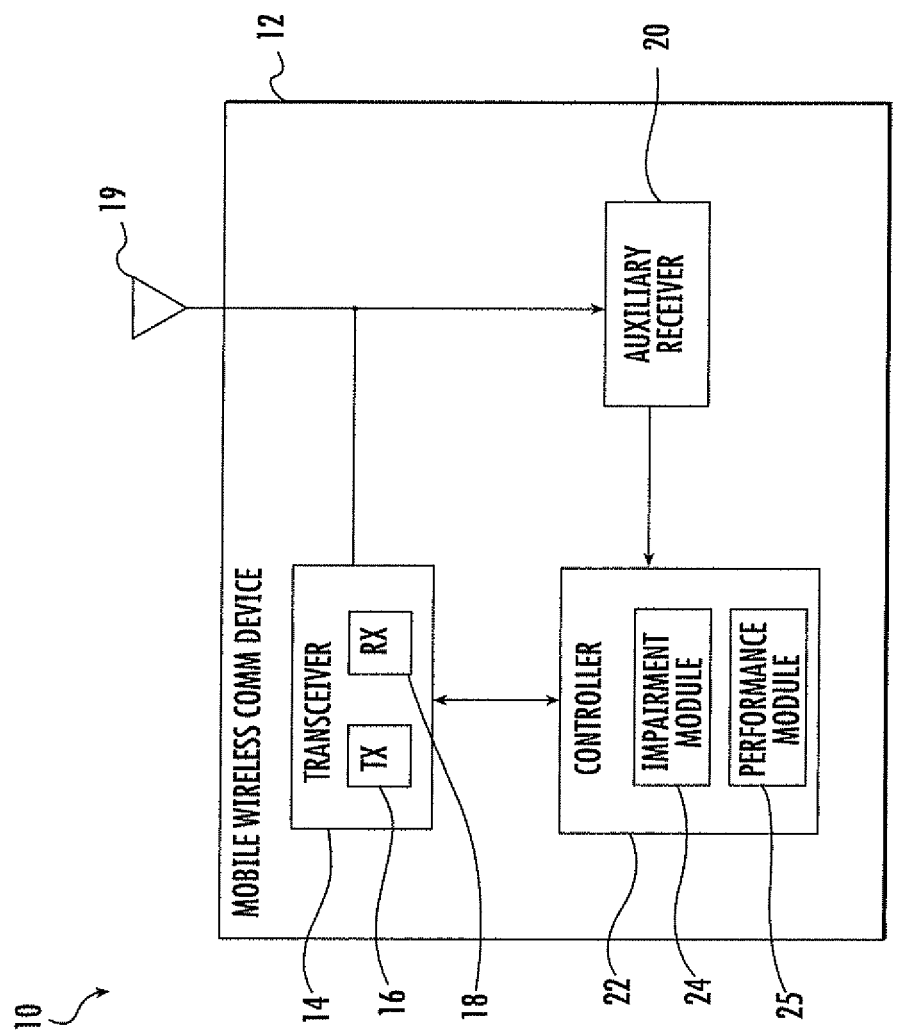
FIG. 1 is a schematic block diagram of a mobile wireless communications device in accordance with one exemplary aspect.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout and prime notations are used to indicate similar elements in alternative embodiments.

In accordance with one exemplary aspect, a mobile wireless communications device comprises a portable housing, and a transceiver, an auxiliary receiver and a controller all carried by the portable housing. The transceiver may comprise a transmitter and a receiver, and the transmitter may be configured to upconvert a transmit baseband modulated signal and generate an RF modulated signal having a transmit impairment. The auxiliary receiver may be coupled to the controller and configured to downconvert the RE modulated signal and generate a receive baseband modulated signal having a receive impairment therein spectrally separated from the transmit impairment.

The controller may be coupled to the transmitter and the auxiliary receiver. The controller may be configured to estimate the transmit impairment while ignoring the receive impairment based on comparing the transmit baseband modulated signal with the receive baseband modulated signal, and generate a transmit impairment compensation signal based upon the estimated transmit impairment.

The controller may be configured to perform the estimating and generating during operation of the transmitter while transmitting data. This advantageously allows the compensation of the transmitter to be performed in the background during regular operation of the transmitter.

The transmit baseband modulated signal may comprise an in-phase (I) component signal and a quadrature-phase (Q) component signal. A non-directional coupler may be carried by the portable housing and coupled between the transceiver and the auxiliary receiver. An antenna may be carried by the portable housing and coupled to the transceiver.

The transmitter may comprises a transmit impairment compensator configured to compensate the transmit baseband modulated signal based on the transmit impairment compensation signal. The controller is configured to perform the comparing in a plurality of iterations to determine difference values therebetween. The transmit impairment compensator may be configured to perform the compensation by iteratively adding correction values to the transmit baseband modulated signal to compensate for the difference values from the plurality of iterations.

The controller may be configured to calculate the correction values based on a least means square (LMS) algorithm. The controller may comprise a delay circuit configured to delay the transmit baseband modulated signal so that the transmit baseband modulated signal and the receive baseband modulated signal match up in time when compared.

The transmitter may comprise a transmit local oscillator operating at a first frequency, and the auxiliary receiver may comprise a receive local oscillator operating at a second frequency offset from the first frequency. This advantageously allows the transmitter impairment to be separated in the frequency domain from the impairments added in the auxiliary receiver. Otherwise, if the transmitter and the auxiliary receiver were to use the same local oscillator with no frequency offset, then the IQ imbalance of the auxiliary receiver becomes indistinguishable from the IQ imbalance introduced in the transmitter. The DC offsets introduced in the auxiliary receiver also become indistinguishable from the offsets introduced in the transmitter.

The transmitter may be configured to operate in a dual-mixer mode, and the auxiliary receiver may be configured to operate in a single-mixer mode. The modulated signal may be generated at a carrier frequency. The transmitter may comprise a first mixer stage operating at an intermediate frequency, and a second mixer stage operating at the carrier frequency minus the intermediate frequency. The auxiliary receiver may comprise a mixer stage operating at the carrier frequency.

Alternatively, the transmitter may be configured to operate in a single-mixer mode, and the auxiliary receiver may be configured to operate in the dual-mixer mode (i.e., a two step down-conversion to DC). The transmitter may comprise a mixer stage operating at the carrier frequency. The auxiliary receiver may comprise a first mixer stage operating at the carrier frequency minus the intermediate frequency, and a second mixer stage operating at the intermediate frequency preferably in the digital domain.

A method aspect is for operating a mobile wireless communications device as described above. The method may comprise generating a transmit baseband modulated, and operating the transmitter to upconvert the transmit baseband modulated signal and generate an RF modulated signal having a transmit impairment. The auxiliary receiver may be operated to downconvert the RF modulated signal and generate a receive baseband modulated signal having a receive impairment therein spectrally separated from the transmit impairment. The controller may be operated to estimate the transmit impairment while ignoring the receive impairment based on comparing the transmit baseband modulated signal with the receive baseband modulated signal, and to generate a transmit impairment compensation signal based upon the estimated transmit impairment. The transmitter may compensate the transmit baseband modulated signal based on the compensation signal.

After the above described impairment has been estimated and compensation has been applied to a mobile wireless communications device, performance of the device can then be monitored, and if necessary, tuned to improve performance. This is advantageously performed without the need for external test equipment. However, this exemplary aspect can be practiced without having to perform the above described impairment estimation and compensation.

In accordance with this exemplary aspect, the transmitter may be configured to be selectively operable based on a control signal between a single-mixer mode (zero-IF direct up-conversion) and a dual-mixer mode (low-IF direct up-conversion) to upconvert the transmit baseband modulated signal and generate an RF modulated signal having the transmit impairment. The auxiliary receiver may be configured to be selectively operable based on the control signal between the single-mixer mode (zero-IF direct conversion), when the transmitter is in the dual-mixer mode, and the dual-mixer mode (low-IF direct conversion), when the transmitter is in the single-mixer mode, to downconvert the RF modulated signal and generate a receive baseband modulated signal having the transmit impairment. All four combinations of using the zero-IF or low-IF modes between the transmitter and receiver are all valid modes of operation.

In particular, the auxiliary receiver may be selectively operable in the single-mixer mode when the transmitter is selectively operable in the dual-mixer mode, and in the dual-mixer mode when the transmitter is selectively operable in the single-mixer mode. The operation is to ensure that the impairments added by the transmitter are frequency separated from the impairments added in the auxiliary receiver. This is so that compensations can be correctly computed by comparing the reference transmit signal with the part of the signal received from the auxiliary receiver that isolates the signal that results from the impairments created in the transmitter or the auxiliary-receiver.

The controller may be configured to compare the transmit baseband modulated signal to the transmit impairment to determine an error difference therebetween, and generate the control signal based on the error difference.

The error difference may correspond to an error vector magnitude (EVM), and the controller may be configured to derive a signal-to-noise ratio (SNR) of the RF modulated signal based on the EVM. The controller may be configured to estimate a bit error rate (BER) of the RF modulated signal based on the SNR.

When the transmitter is operating in the dual-mixer mode, this is advantageous when transmitting data at a high output power while fighting VCO pulling. However, if performance of the transmitter begins to decline, then the transmitter may be selected to operate in the single-mixer mode while transmitting at low power. In this mode, the transmitter may be recompensated if necessary so that the performance of the transmitter is improved.

If the auxiliary receiver is operating in the dual-mixer mode, then this is advantageous for estimating the impairments created in the transmitter and in the auxiliary receiver, which in turn may be used when compensating the transmitter or the auxiliary receiver. Once the impairments have been compensated in the auxiliary receiver, then the auxiliary receiver may advantageously be operated in the single-mixer mode.

For example, the transmitter may be selectively configured to operate in the dual-mixer mode and may comprise a first mixer stage operating at the intermediate frequency, and a second mixer stage operating at the carrier frequency minus the intermediate frequency. In this case, the auxiliary receiver may be selectively configured to operate in the single-mixer mode and may comprise a mixer stage operating at the carrier frequency. Alternatively, the transmitter may be operated in low-IF mode to allow frequency separation of transmit and receive impairments (i.e., DC offsets and I/Q imbalance).

For another example, the transmitter may be selectively configured to operate in the single-mixer mode and may comprise a mixer stage operating at the carrier frequency. In this case, the auxiliary receiver may be selectively configured to operate in the dual-mixer mixer and may comprise a first mixer stage operating at the carrier frequency minus an intermediate frequency, and a second mixer stage operating at the intermediate frequency.

A method aspect is for operating a mobile wireless communications device as described above. The method may comprise selectively operating the transmitter based on a control signal between a single-mixer mode and a dual-mixer mode to upconvert a transmit baseband modulated signal and generate an RF modulated signal having a transmit impairment. The auxiliary receiver may be selectively operated based on the control signal between the single-mixer mode and the dual-mixer mode to downconvert the RF modulated signal and generate a receive baseband modulated signal having the transmit impairment. The transmitter may be operated in the dual-mixer mode when transmitting very high output power, in which case, VCO pulling degrades the output spectral purity.

The auxiliary receiver may be selectively operable in the single-mixer or dual-mixer mode when the transmitter is selectively operable in the dual-mixer mode, and in the dual-mixer mode when the transmitter is selectively operable in the single-mixer mode. The method may further comprise operating the controller to compare the transmit baseband modulated signal to the transmit impairment to determine an error difference therebetween, and generate the control signal based on the error difference.

Referring initially to FIG. 1, a mobile wireless communications device 10 comprises a portable housing 12, a transceiver 14 comprising a transmitter 16 and a receiver 18 carried by the portable housing, and an antenna 19 coupled to the transceiver. An auxiliary receiver 20 is carried by the portable housing 12 and is coupled to the transmitter 16. The auxiliary receiver 20 may also be referred to as a feedback receiver. The controller 22 is carried by the portable housing 12 and is coupled to the transmitter 16 and to the auxiliary receiver 20. The controller 22 includes an impairment module 24 to estimate impairment within the transmitter 16, and to generate a transmit impairment compensation signal based on the estimated transmit impairment.

More particularly, the transmitter 16 is configured to upconvert a transmit baseband modulated signal and generate an RF modulated signal having the transmit impairment therein. Typically, analog circuitry in the transmit chain within the transmitter 16 causes the transmit impairment.

The auxiliary receiver 20 is configured to downconvert the RF modulated signal and generate a receive baseband modulated signal having a receive impairment therein spectrally separated from the transmit impairment. Typically, analog circuitry in the receive chain within the auxiliary receiver 20 causes the receive impairment. The controller 22 is configured to estimate the transmit impairment while ignoring the receive impairment based on comparing the transmit baseband modulated signal with the receive baseband modulated signal, and generate the transmit impairment compensation signal based upon the estimated transmit impairment. The transmit impairment compensation signal is provided to the transmitter.

The auxiliary receiver 20 is an additional receiver that is included within the mobile wireless communications device 10 that may advantageously be used to service the needs of the transmitter 12. Estimation and compensation for IQ imbalance and DC offset are examples of servicing the needs of the transmitter 16, as will be appreciated by those skilled in the art.

The auxiliary receiver 20 can be of lower performance as compared to the main receiver 18 since it is primarily designed to serve the transmitter. For example, the auxiliary receiver 20 does not need to have a high dynamic range like the main receiver 18, nor a high selectivity. Alternatively, the main receiver 18 may operate in place of the auxiliary receiver to provide the same function if the standard allows for a time-division duplex (TDD) operation in which the main receiver is generally not needed when the transmitter 16 is operating.

The auxiliary receiver 20 is configured to have an independent, dedicated phase-locked loop that is offset from the local oscillator operating the transmitter 16. This advantageously allows the transmitter impairment to be separated in the frequency domain from the impairments added in the auxiliary receiver 20. If the main receiver 18 is a TDD receiver to provide the function of the auxiliary receiver 20, then this implies that it should operate with its own independent PLL.

Otherwise, if the transmitter 16 and the auxiliary receiver 20 were to use the same local oscillator with no frequency offset, then the IQ imbalance of the auxiliary receiver becomes indistinguishable from the IQ imbalance introduced in the transmitter. The DC offsets introduced in the auxiliary receiver 20 also become indistinguishable from the offsets introduced in the transmitter 16.

The mobile wireless communications device 10 may be a multi-frequency band device that operates over a 2.4 GHz frequency band (i.e., approximately 2.4 to 2.483 GHz) and over a 5 GHz frequency band (i.e., approximately 4.9 to 6 GHz), for example. Depending on the intended application, the mobile wireless communications device 10 may operate over other frequency bands, as readily appreciated by those skilled in the art.

The mobile wireless communications device 10 will now be discussed in greater detail with reference to FIG. 2. The transmitter 16 includes a data modulator 30 that modulates data to be transmitted and provides a digital in-phase (I) component signal and a digital quadrature-phase (Q) component signal to the transmitter 16.

The transmitter 16 is configured as a low-IF transmitter (i.e., dual-mixer mode) since it includes a two mixer stages, wherein the first mixer stage 40 operates at an intermediate frequency (IF), and the second mixer stage 50 operates at the desired carrier frequency offset by the intermediate frequency so that the resulting frequency of the RF modulated signal to be transmitted is at the desired carrier frequency. The dual-mixer mode allows the output spectrum of the transmitter 16 to be offset with respect to the frequency of the local oscillator associated with the second mixer stage. This significantly helps to reduce VCO pulling by the power amplifier 64.

The first mixer stage 40 includes a pair of mixers 42a, 42b that receive the digital I and Q component signals and multiplies them by a complex exponential 44. The first mixer stage 40 translates the digital I and Q component signals in frequency to an intermediate frequency $\omega_{IF}$. The translated digital I and Q component signals are applied to digital-to-analog converters 46a, 46b. The resulting translated analog I and Q component signals are then filtered using low pass filters 48a, 48b.

The second mixer stage 50 includes a pair of mixers 52a, 52b that receive the translated analog I and Q component signals at the intermediate frequency $\omega_{IF}$, and I and Q local oscillator signals at a frequency of $\omega_c - \omega_{IF}$ from a transmit phase-locked loop 54. The transmit phase-locked loop 54 includes a local oscillator 56 and a voltage controlled oscillator 58 coupled thereto. The frequency $\omega_c - \omega_{IF}$ is the desired carrier frequency $\omega_c$ offset by the intermediate frequency $\omega_{IF}$.

The output of the second mixer stage 50 is the RF modulated I component signal and the RF modulated Q component signal at the desired carrier frequency $\omega_c$.

A summer 60 sums the outputs of the second mixer stage 50 to provide the RF modulated signal at the carrier frequency $\omega_c$. The low-IF transmitter architecture shown in FIG. 2 allows the local oscillator 56 of the transmit phase-locked loop 54 to be placed at an offset to the carrier frequency of the modulated signal.

The modulated signal from the summer 60 is amplified with a pre-power amplifier (PPA) 62. The pre-power amplifier 62 is used to insure that there is enough power to drive the power amplifier (PA) 64. The output of the power amplifier 64 is coupled to the antenna 19. The output of the power amplifier 64 has a spectrum that is offset with respect to the frequency of the local oscillator 56. This significantly helps to reduce VCO pulling by the power amplifier 64.

Reducing VCO pulling is a design challenge for deep sub-micron transceivers 14 that have small feature sizes and cannot provide enough isolation between the output of the power amplifier 64 and the VCO 58. The output of the power amplifier 64 may be up to 27 dBm, for example. At high output powers, various couplings in the transceiver 14 and the circuit boards therein create an aggressing signal at the VCO 58 which "pulls" the VCO, thereby forcing the local oscillator 56 to momentarily follow the output of the power amplifier 64 and violate phase noise specifications, before the transmit phase-locked loop 54 fights it off.

The low-IF transmitter advantageously helps to reduce VCO pulling by offsetting the frequency of the local oscillator 56 $\omega_c \omega_{IF}$ and the frequency of the RF modulated signal $\omega_c$ output by the power amplifier 64. The more separated in frequency these signals are, then the more the VCO pulling is reduced. However, there is now an added requirement that the RF modulated signal output from the power amplifier 64 still needs to meet certain design specifications, such as a high IQ balance and DC offset. This means that impairments in the transmitter 16 need to estimated and compensated. Typically, the analog circuitry in the transmit chain within the transmitter 16 causes such impairments.

If the IF frequency is selected to be zero, the first mixer 42a/42b does not up-convert, but rather multiplies the baseband I/Q signals with unity. The second mixer 52a, 52b up-converts using the local oscillator frequency $\omega_c - \omega_{IF} = \omega_c - 0 = \omega_c$. Hence, in this selection, the transmitter 16 becomes single-mixer transmitter with zero IF frequency.

During background calibration, the transmitter 16 is configured as a zero-IF transmitter (i.e., single-mixer mode) wherein the first mixer stage 40 operates at an intermediate frequency (IF) of zero, and the second mixer stage 50 operates at the desired carrier frequency. The single-mixer mode directly places the output spectrum of the transmitter 16 at the desired carrier frequency. This mode is turned on for power levels of the transmitter where VCO pulling is not a concern. This mode is used to adaptively update the degradation estimates in the background in anticipation of the low-IF mode, when it will be turned on for higher output powers.

As will now be explained, a time domain approach is used to estimate the transmit impairment (e.g., IQ imbalance and DC offset) in the transmitter 16. This requires the RF modulated signal with the transmit impairment generated by the transmitter 16 for transmission to be feed back to the auxiliary receiver 20.

The auxiliary receiver 20 is configured to downconvert the RF modulated signal having the transmit impairment. Since the auxiliary receiver 20 also includes analog circuitry in the receive chain, a receive impairment is added along with the transmit impairment. The receive impairment is to be spectrally separated from the transmit impairment.

The RF modulated signal having the transmit impairment from the transmitter 16 is provided to the auxiliary receiver 20 using a non-directional coupler 70 coupled between the pre-power amplifier 62 and the power amplifier 64. Alternatively, a non-directional coupler 74 may be coupled between the power amplifier 64 and the antenna 19.

An advantage of using a non-directional coupler 72, 74 is that it can operate over a wide band of operation, and its performance remains well controlled over temperature and frequency changes. In addition, a non-directional coupler 70, 74 prevents the local oscillator of the auxiliary receiver 20 from parasitically coupling to the output of the transmitter 16.

A switch in the auxiliary receiver 20 is operated to select which non-directional coupler 70, 74 is to provide the RF modulated signal having the transmit impairment. The selected non-directional coupler 70, 74 directs a small amount of signal energy from the antenna to the auxiliary receiver 20.

In one embodiment, the non-directional coupler 70 comprises a signal path conductor 71 and a feedback path conductor 72 inductively coupled thereto, and the non-directional coupler 74 also comprises a signal path conductor 75 and a feedback path conductor 76 inductively coupled thereto.

Figure 3:
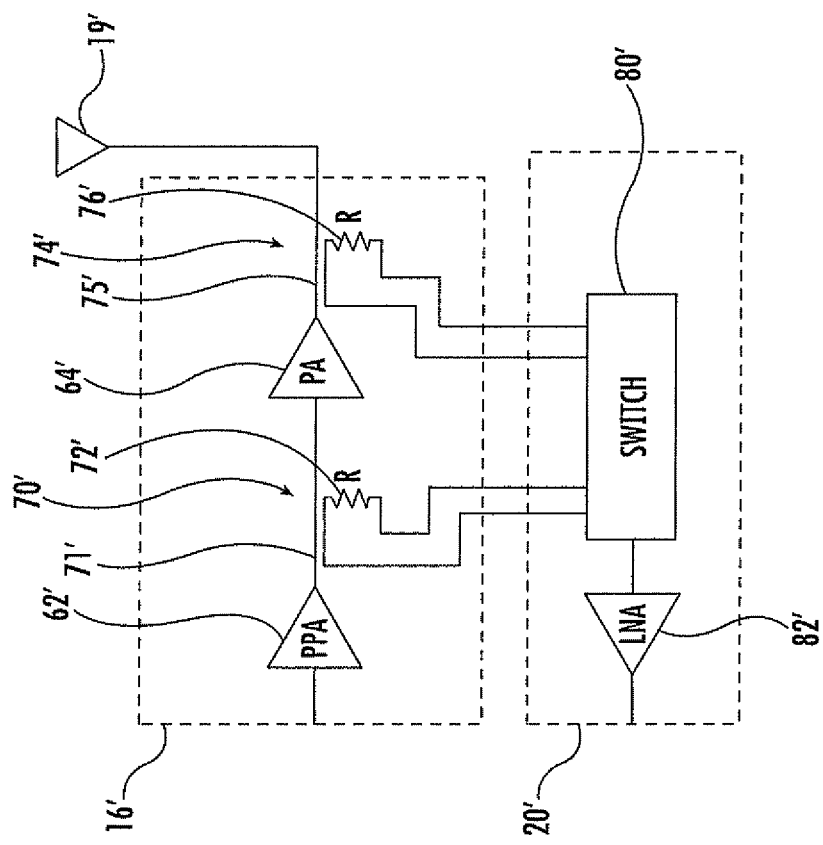
FIG. 3 is a schematic block diagram of another embodiment of the non-directional coupler illustrated in FIG. 2.

In another embodiment, as illustrated in FIG. 3, the non-directional coupler 70' is a resistor 72' directly connected to the transmitter output node and feeds to the LNA 82' of the auxiliary receiver 20'. Since the impedance looking into the PPA output and PA input is two 50 ohm impedances in parallel, a 500-10,000 ohm resistance can be used to directly connect the LNA input to this output node. Alternatively, the PA output can also drive the LNA input. Any of the two drivers can be selected by using a switched LNA or a switch before the LNA that can provide the desired connection under software control.

Instead of using a non-directional coupler, it is possible to use a directional coupler. The use of a directional coupler provides a steady feedback signal independent of the VSWR variation at the antenna or the PPA load. However, a non-directional coupler is preferred because it is wideband and simpler to implement.

The RF modulated signal having the transmit impairment is received by the switch 80. The switch 80 is operated by the controller 22. The RF modulated signal is provided to a low noise amplifier 82. The output of the low noise amplifier 82 is provided to a first mixer stage 90. The auxiliary receiver 20 is configured as a 0-IF receiver (i.e., single-mixer mode) since the transmitter 16 is configured as a low-IF transmitter (i.e., dual-mixer mode). This means that the second mixer stage 104 is not needed and is selectively set to a value of 1 (i.e., $e^{j0}$) by the controller 22. In a different embodiment, the switch 80 can be combined with the LNA to provide two input pairs, one of which is selected under software control.

The mixer stage 90 includes a pair of mixers 92a, 92b that receive the RF modulated signal having the transmit impairment, and I and Q local oscillator signals from a receive phase-locked loop 94. The receive phase-locked loop 94 includes a local oscillator 96 and a voltage controlled oscillator 98 coupled thereto.

The frequency of the RF modulated signal having the transmit impairment is $\omega_c$. Since the frequency of the local oscillator 56 in the transmitter 16 is $\omega_c$, the frequency of the local oscillator 96 in the auxiliary receiver 20 is $\omega_c - \omega_{IF}$. As noted above, the auxiliary receiver 20 is configured to have an independent, dedicated phase-locked loop 96 that is offset from the local oscillator 56 operating the transmitter 16. This advantageously allows the transmitter impairment to be separated in the frequency domain from the impairments added in the auxiliary receiver 20.

The output of the mixers 92a, 92b provide receive modulated analog I and Q component signals at the intermediate frequency $\omega_{IF}$. These signals are provided to low pass filters 100a, 100b and then to analog-to-digital converters 102a, 102b so that the receive baseband modulated analog I and Q component signals are now receive baseband modulated digital I and Q component signals at the intermediate frequency $\omega_{IF}$. The receive baseband modulated digital I and Q component signals at the intermediate frequency $\omega_{IF}$ include the receive impairment spectrally separated from the transmit impairment. These signals are passed through the mixers 106a, 106b. The second mixer stage 104 translates this complex signal to zero-IF in a second down-conversion operation by frequency $T_{IF}$.

Figure 4:
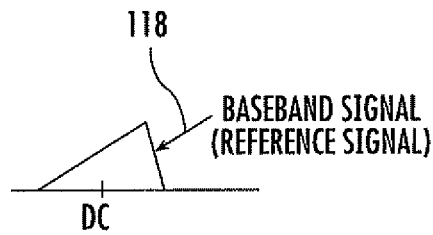
FIG. 4 is a spectral plot of the transmit baseband modulated signal provided by the data modulator in accordance with one exemplary aspect.

Spectral plots of the transmit baseband modulated signal, the RF modulated signal and the receive baseband modulated signal will now be discussed in reference to FIGS. 4-6. The transmit baseband modulated signal as provided by the data modulator 30 to the transmitter 16 is indicated by reference 118 in FIG. 4. The transmit baseband modulated signal is also referred to as the reference signal since is does not include impairments from the transmitter 16.

Figure 5:
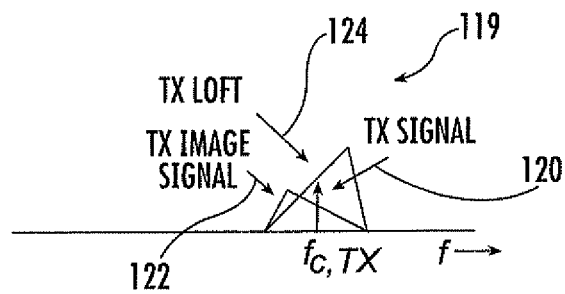
FIG. 5 is a spectral plot of the RF modulated signal having the transmit impairment as provided by the transmitter in accordance with one exemplary aspect.

The RF modulated signal which is the transmit baseband modulated signal having been upconverted by the transmitter 16 is indicated by reference 119 in FIG. 5. The RF modulated signal includes the transmit baseband modulated signal and the impairments introduced by the transmitter 16. The RF modulated signal is also provided to the auxiliary receiver 20. Within the RF modulated signal 119, the transmit baseband modulated signal is indicated by reference 120, an image of the transmit baseband modulated signal is indicated by reference 122. The image of the transmit baseband modulated signal 122 folds around the carrier frequency of the transmitter ($f_{c,TX}$), and the transmit local oscillator feedthrough (LOFT) 124 appears as a tone that can cause violation of the origin offset error at low output powers.

Figure 6:
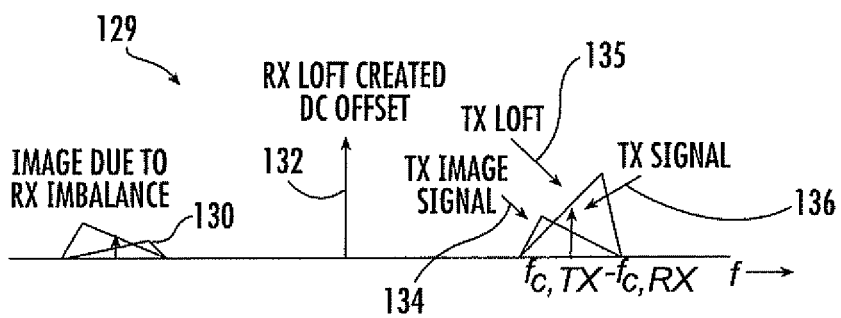
FIG. 6 is a spectral plot of the receive baseband modulated signal having the receive impairment spectrally separated from the transmit impairment as provided by the auxiliary receiver in accordance with one exemplary aspect.

The receive baseband modulated signal as provided by the auxiliary receiver 20 is indicated by reference 129 in FIG. 6. The receive baseband modulated signal includes the transmit baseband modulated signal as well as the receive impairment spectrally separated from the transmit impairment. Since the receiver is a low-IF receiver, the degradations due to the auxiliary receiver 20 as indicated by references 130, 132 are now spectrally offset from the degradations due to the transmitter 16. The degradations due to the transmitter 16 are indicated by references 134, 135. The transmit baseband modulated signal is indicated by reference 136.

Figure 2:
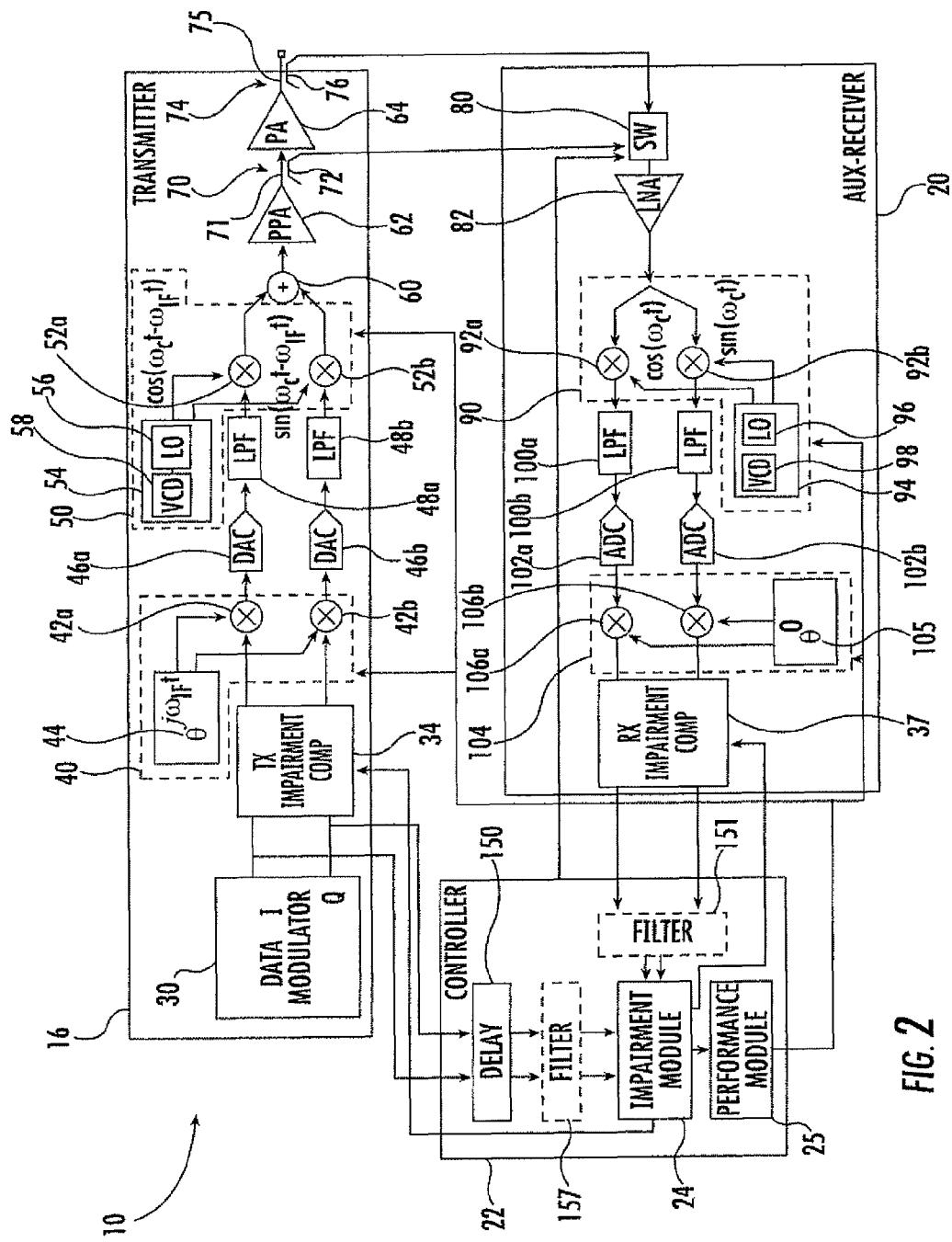
FIG. 2 is a more detailed schematic block diagram of the mobile wireless communications device illustrated in FIG. 1.

In the illustrated example of the mobile wireless communications device 10 in FIG. 2, the transmitter 16 comprises two mixer stages 40, 50, and the auxiliary receiver 20 also comprises two mixer stages 90, 104. During calibration both of the mixer stages 90, 104 are operational for translating the received baseband modulated signal. The first mixer stage 40 in the transmitter 16 is selectively set to a value of 1 (i.e., $e^0$) by the controller 22.

Figure 7:
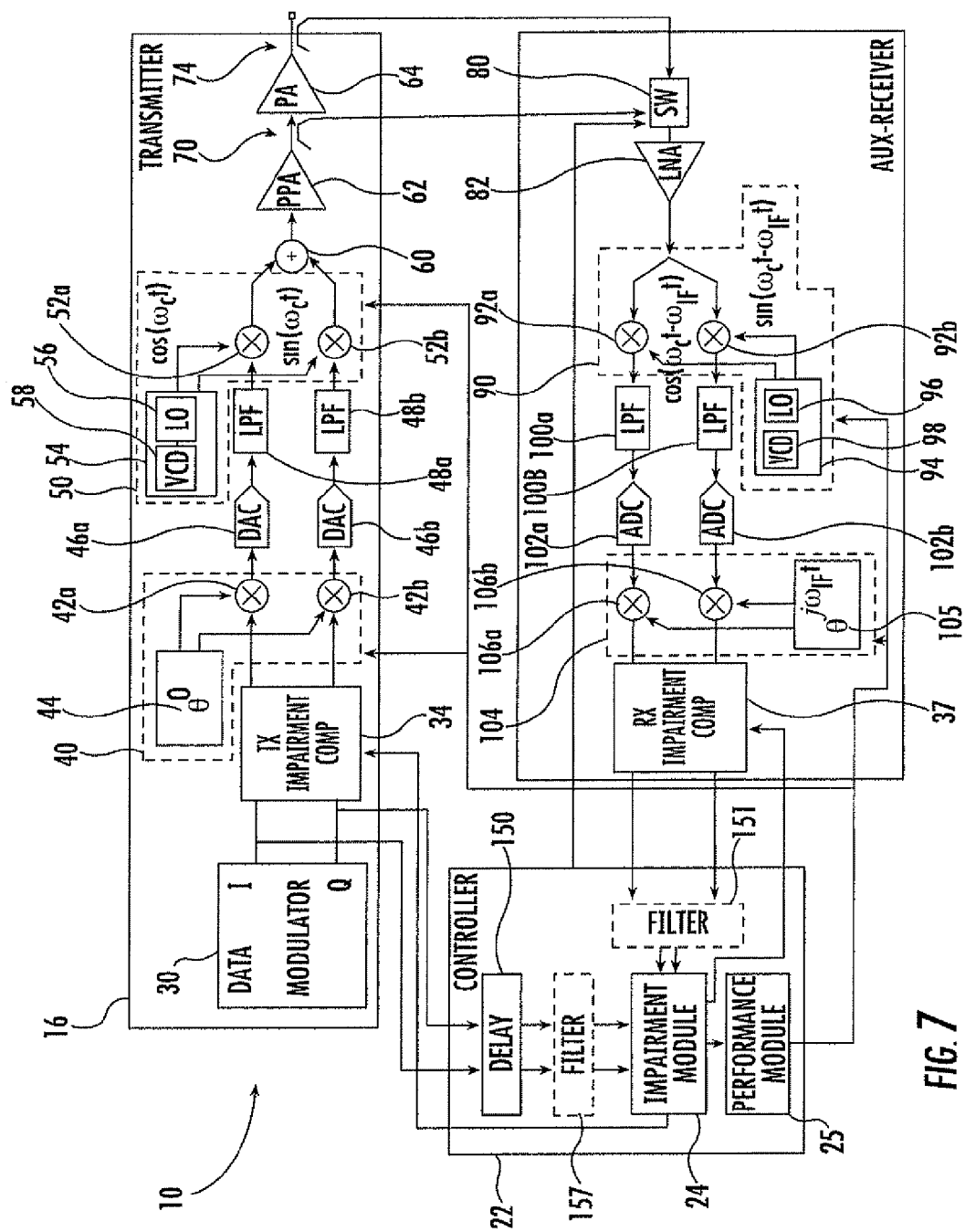
FIG. 7 is a more detailed schematic block diagram of the mobile wireless communications device illustrated in FIG. 1.

Only one of the mixer stages 50 in the transmitter 16 may be operational for translating the transmit baseband modulated signal, as illustrated in FIG. 7. The other mixer stage 40 is not needed and is selectively set to a value of 1 (i.e., $e^0$) by the controller 22.

When the transmitter 16 is operating in the dual-mixer mode, this helps to fight VCO pulling when the power amplifier 64 is operating at high power. When the power amplifier

64 is operating at low power, then the transmitter 16 may be configured to operate in the single-mixer mode. In either case, the local oscillator 96 in the auxiliary receiver 20 is offset from the local oscillator 66 in the transmitter 16.

Compensation of the transmitter 16 will now be discussed in greater detail. The controller 22 is configured to perform the estimating during operation of the transmitter 16 while transmitting data. Special tones or calibration signals are not required. Instead, data transmitted during normal operation of the transmitter 16 is used.

As illustrated in FIG. 2, the controller 22 is coupled to the output of the data modulator 30 and to the output of the auxiliary receiver 20. The controller 22 receives the transmit baseband modulated signal, as indicated by reference 118 in FIG. 4. The transmit baseband modulated signal is also referred to as the reference signal since it does not include impairments from the transmitter 16.

The controller 22 also receives the receive baseband modulated signal as provided by the auxiliary receiver 20, as indicated by reference 129 in FIG. 6. The receive baseband modulated signal includes the transmit baseband modulated signal as well as the receive impairment spectrally separated from the transmit impairment.

The controller 22 includes a delay circuit 150 configured to delay the transmit baseband modulated signal so that this signal and the receive baseband modulated signal match up in time when compared. The delay circuit 150 may be configured to implement a fixed delay corresponding to inherent delays of the transmitter 16 and the auxiliary receiver 30, and a variable delay corresponding to variable environmental conditions. The variable delay accounts for environmental conditions, such as operating temperature variations, for example. In particular, the analog sections within the transmitter 16 and the auxiliary receiver 20 are effected by temperature variations.

The impairment module 24 within the controller 22 estimates impairment within the transmitter 16, and generates an impairment compensation signal for the transmitter based on the estimated transmit impairment. The transmitter 16 includes a transmit impairment compensator 34 configured to compensate the transmit baseband modulated signal based on the compensation signal. The transmit impairment compensator 34 is positioned between the data modulator 30 and the first mixer stage 40. Alternatively, the transmit impairment compensator 34 may be implemented within the controller itself if the transmitter chain is routed through the controller 22.

The impairment module 24 is configured to estimate the transmit impairment by comparing the transmit baseband modulated signal with the receive baseband modulated signal while ignoring the receive impairment. The impairment module 24 performs the comparing in a plurality of iterations to determine difference values therebetween. The transmit impairment compensator 34 then performs the compensation by iteratively adding correction values, as provided by the compensation signal, to the transmit baseband modulated signal to compensate for the difference values from the plurality of iterations. A least means square (LMS) algorithm may be used to determine the compensation values, for example.

The impairment module 24 may be implemented within a processor, for example, as appreciated by those skilled in the art. The impairment module 24 is configured to estimate IQ imbalance and local oscillator feedthrough, and will be discussed as an inverse system modeling problem. Output of the impairment module 24 is modeled based on the following equation:

$$y(n) = w_1 \cdot x(n) + w_2 \cdot x^*(n) + dc$$

The transmit baseband modulated signal is represented by $x(n)$, and an image of the transmit baseband modulated signal is represented by $x^*(n)$. Weighting or gain values are represented by $w_1$ and $w_2$, and are complex numbers. A dc term is also included in the equation.

The weighting value $w_1$ embodies the path gain from the digital representation of the ideal transmit baseband modulated signal to the digitized receive baseband modulated signal at the output of the auxiliary receiver 20. The absolute value of $w_1$ is the ratio $w_2/w_1$ and $dc/w_1$ that needs to receive the appropriate compensation. The compensation to $w_1$ can be normalized without any loss in fidelity of the compensation. It is important to keep the feedback gain high enough such that the digital representation of the receive baseband modulated signal from the auxiliary receiver 20 spans almost the full dynamic range of the analog-to-digital converters 102a, 102b. This provides a high signal to noise ratio and allows a high image and local oscillator feedthrough to be achieved. The error signal is given based on the following equation:

$$e(n) = d(n) - y(n) = d(n) - w_1 \cdot x(n) - w_2 \cdot x^*(n) - dc$$

The desired response is represented by $d(n)$. Using the steepest descent approach, the following is obtained:

$$\frac{\partial}{\partial w_1} e(n) = -x^*(n)$$

$$\frac{\partial}{\partial w_2} e(n) = -x(n)$$

$$\frac{\partial}{\partial dc} e(n) = -1$$

Therefore, the update equations are as follows:

$$w_1(n+1) = w_1(n) + \mu \cdot e(n) \cdot x^*(n)$$

$$w_2(n+1) = w_2(n) + \mu \cdot e(n) \cdot x(n)$$

$$dc(n+1) = dc(n) + \mu \cdot e(n))$$

On convergence, the error signal is driven to zero so that $y(n) = d(n)$ in a mean square sense. Now, the inverse function has been calculated.

The transmit impairment estimation may include the use of a very selective low pass filter. The low pass filter may be a single stage and be programmable with the following transfer function:

$$H_2(z) = \frac{2^{-M}}{1 - (1 - 2^{-M})z^{-1}}$$

where M is programmable from 0-10. This filter has unity gain at dc. The reference signal for determining the IQ imbalance and dc offsets introduced by the receiver may be determined using synthesis. The output signal of the impairment module 24 may be synthesized as follows:

$$y(n) = x(n) + \frac{w_2}{w_1} \cdot x^*(n) + \frac{dc}{w_1}$$

This creates the reference signal centered at dc. This signal is up-converted to the low pass filter to create the reference signal needed to compute the impairments introduced in the auxiliary receiver 20.

Operation of the impairment module 24 may be simplified based on additional filtering of the receive baseband modulated signal before being provided as an input to the impairment module 24. In the above embodiment, the controller 20 typically includes a filter 151 that needs to be large enough to pass the transmit impairment portion of the signal while rejecting the receive impairment portion of the signal. After the second down-conversion in the auxiliary receiver 20, the transmit impairment signal 136 centers at DC and can be isolated from the receiver impairments using a lowpass filter. This filter 151, isolates the transmit impairment signal so that the controller 22 can compare it to the ideal reference signal (output of 150) and estimate the impairments using the LMS algorithm or a different method.

Figure 8:
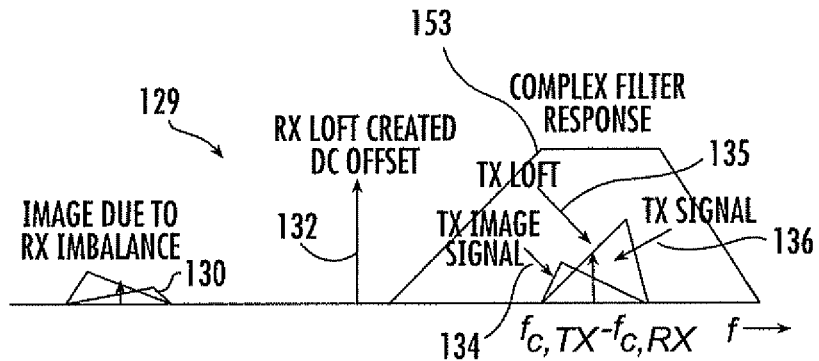
FIG. 8 is a spectral plot of a complex filter applied to the receive baseband modulated signal in accordance with one exemplary aspect.
Figure 9:
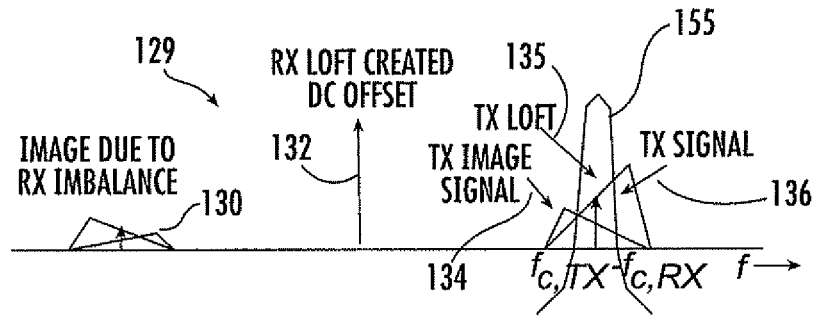
FIG. 9 is a spectral plot of a selective filter applied to the positive frequencies in the receive baseband modulated signal in accordance with one exemplary aspect.

In another embodiment of this filter 151, a complex filter may be used. The complex filter has a response 153 as illustrated in FIG. 8. The complex filter is used to select the positive frequencies, which are then provided to the impairment module 24 after translating the positive frequencies at zero-IF.

As an alternative to the complex filter, a lossy integrator may filter the zero-IF down-converted signal which is output from the second down-conversion stage 104 in the auxiliary receiver 20. This filter can be implemented very simply to have a cascade of filters, each with a single-pole IIR response. This filter implementation is inexpensive, yet very powerful. The filtering operation modifies the in-band frequency components of the auxiliary receiver output signal. Hence, it may be compared to a similarly modified reference signal (i.e., the ideal transmit signal from the data modulator 30). The filter 157 is identical to the filter 151, and hence modifies the reference signal in the same way as the filter 151 modifies the output of the auxiliary receiver output signal. The same LMS update equations can be used to estimate the impairments caused in the transmitter.

The impairment module 24 may also be used to estimate and generate a receive impairment compensation signal to correct for impairments within the auxiliary receiver 20. The auxiliary receiver 20 includes a receive impairment compensation signal for the receive impairment compensator 37 within the auxiliary receiver 20.

Figure 10:
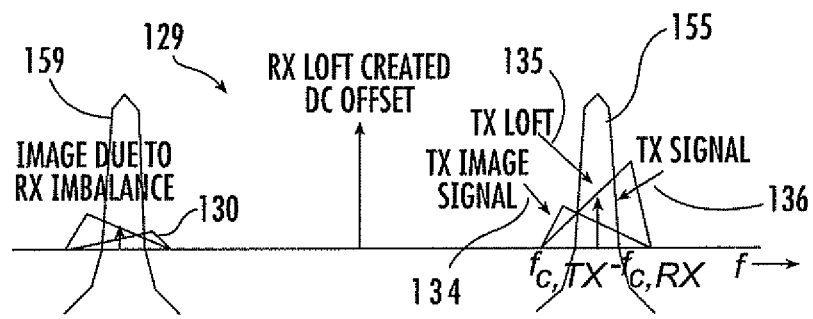
FIG. 10 is a spectral plot of selective filters applied to the positive and negative frequencies in the receive baseband modulated signal in accordance with one exemplary aspect.

The receive impairment compensator 37 is positioned at the output of the last mixing stage. Alternatively, the receive impairment compensator 34 may be implemented within the controller itself if the receive chain is routed through the controller 22. As discussed above for the estimation and compensation of the transmit impairment, an inverse system modeling is also used for the receive impairment As discussed above, complex filtering and very selective complex lossy integrator filtering may be used to provide inputs to the impairment module 24. In addition, the receive impairment may be estimated without requiring the transmit baseband modulated signal. Instead, a very selective complex lossy integrator may be used to extract a portion of the signal spectrum centered at the positive intermediate frequency, and a very selective complex lossy integrator may be used to extract a portion of the signal spectrum centered at the negative intermediate frequency. The complex lossy integrators have responses 155, 159 as illustrated in FIG. 10.

Figure 11:
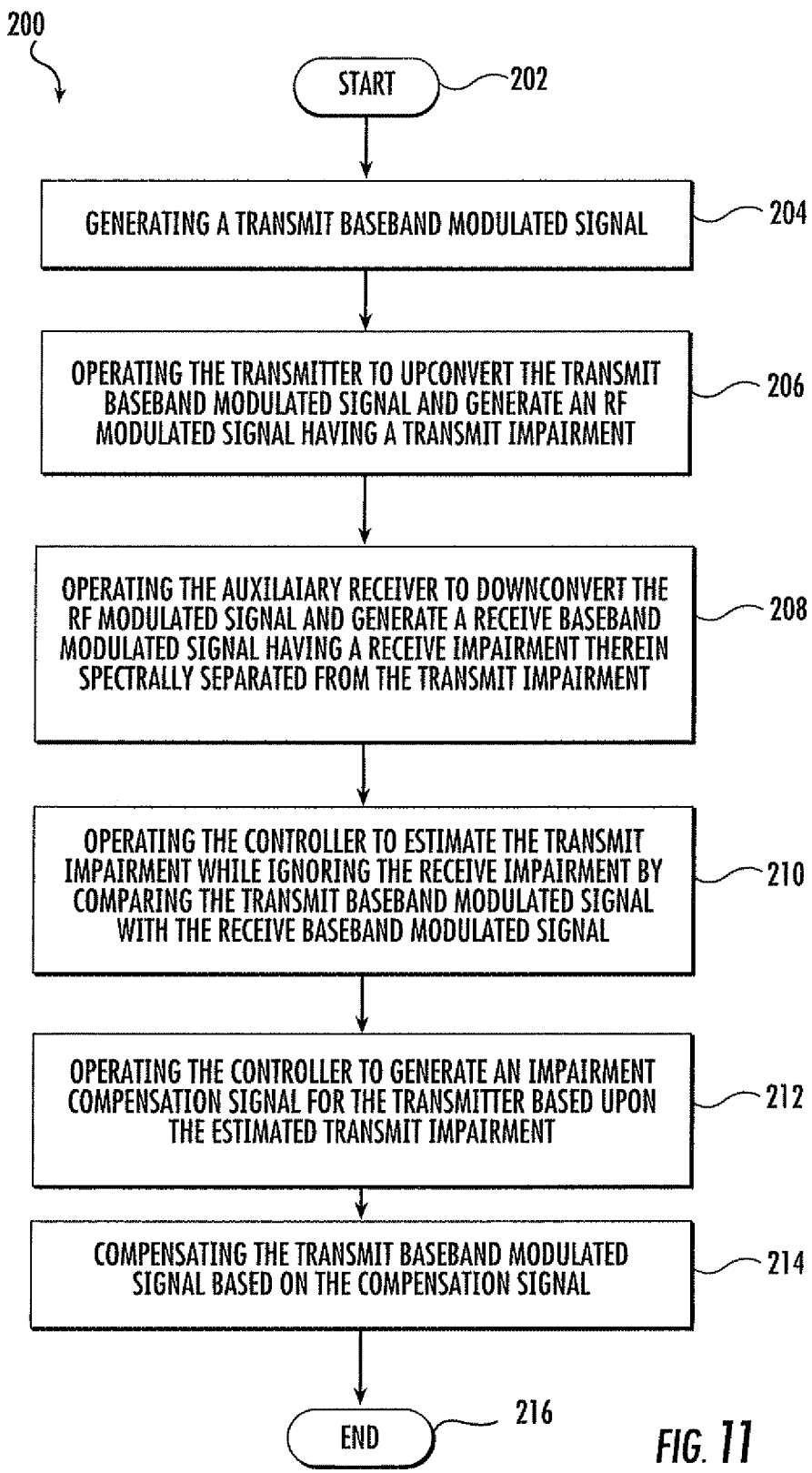
FIG. 11 is a flowchart illustrating a method for operating a mobile wireless communications device while taking into account impairment compensation in accordance with one exemplary aspect.

A flowchart 200 illustrating a method for operating a mobile wireless communications device 10 while taking into account impairment compensation will now be discussed in reference to FIG. 11. From the start (Block 202), the method comprises generating a transmit baseband modulated at Block 204. The transmitter 16 is operated at Block 206 to upconvert the transmit baseband modulated signal and generate an RF modulated signal having a transmit impairment. The auxiliary receiver 20 is operated at Block 208 to downconvert the RF modulated signal and generate a receive baseband modulated signal having a receive impairment therein spectrally separated from the transmit impairment. The controller 22 is operated at Block 210 to estimate the transmit impairment while ignoring the receive impairment by comparing the transmit baseband modulated signal with the receive baseband modulated signal, and is operated at Block 212 to generate an impairment compensation signal for the transmitter 16 based upon the estimated transmit impairment. The transmitter 16 compensates the transmit baseband modulated signal at Block 214 based on the compensation signal. The method ends at Block 216.

After the above described impairment has been estimated and compensation has been applied to the mobile wireless communications device 10, performance of the device can then be monitored, and if necessary, tuned to improve performance. This is advantageously performed without the need for special test signals or external test equipment. Performance monitoring and tuning may be performed during operation of the transmitter while transmitting data. However, this exemplary aspect can be practiced without having to perform the above described impairment estimation and compensation, as readily appreciated by those skilled in the art.

As illustrated in FIG. 2, a performance monitoring module 35 is included in the controller 22 along with the impairment module 24. The transmitter 16 is selectively operable based on a control signal between the single-mixer mode and the dual-mixer mode to upconvert a transmit baseband modulated signal and generate an RF modulated signal having a transmit impairment.

The auxiliary receiver 20 is also selectively operable based on the control signal between the single-mixer mode, when the transmitter 16 is in the dual-mixer mode, and the dual-mixer mode, when the transmitter is in the single-mixer mode, to downconvert the RF modulated signal and generate a receive baseband modulated signal having the transmit impairment. In particular, the auxiliary receiver 20 is selectively operable in the single-mixer mode when the transmitter 16 is selectively operable in the dual-mixer mode, and in the dual-mixer mode when the transmitter is selectively operable in the single-mixer mode.

The performance module 25 within the controller 22 compares the transmit baseband modulated signal to the transmit impairment to determine an error difference therebetween, and generate the control signal based on the error difference. The error difference corresponds to an error vector magnitude (EVM), and the performance module 25 then derives a signal-to-noise ratio (SNR) of the RF modulated signal based on the EVM.

Although not illustrated, the mobile wireless communications device 10 may also include an auxiliary transmitter along with the auxiliary receiver 20. The auxiliary transmitter may be used for determining impairment compensation of the receiver. The same principles discussed herein are equally applicable to the auxiliary transmitter and the main receiver 18, as readily appreciated by those skilled in the art.

Figure 12:
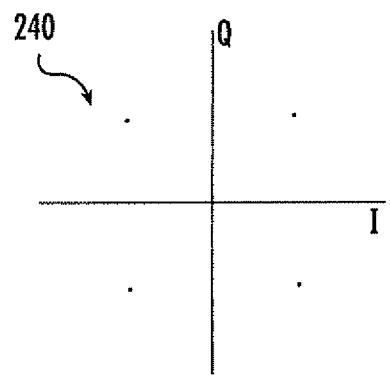
FIG. 12 is a constellation plot of a signal with zero EVM in accordance with one exemplary aspect.
Figure 13:
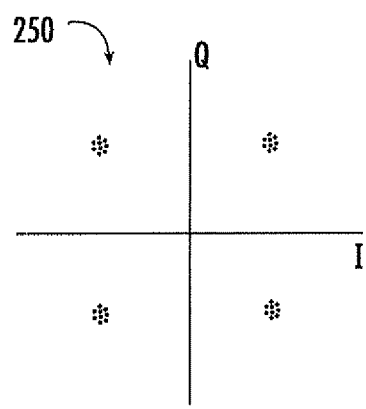
FIG. 13 is a constellation plot of a signal with a non-zero EVM in accordance with one exemplary aspect.

The EVM is also referred to as a receive constellation error (RCE), and is a measure used to quantify the performance of a digital radio transmitter or receiver. A signal sent by an ideal transmitter or received by a receiver with a zero EVM would have all constellation points 240 precisely at the ideal locations, as illustrated in FIG. 12. However, various imperfections in the implementation (such as DC offset and IQ imbalance) cause the actual constellation points 250 to deviate from the ideal locations, as illustrated in FIG. 12. Essentially, EVM is a measure of how far the points are from the ideal locations. The controller 22 is configured to estimate a bit error rate (BER) of the RF modulated signal based on the SNR.

The RF modulated signal is generated at a carrier frequency, and the transmitter 16 is selectively configured to operate in the dual-mixer mode and comprises a first mixer stage 40 operating at the carrier frequency minus an intermediate frequency, and a second mixer stage 50 operating at the intermediate frequency. In this configuration, the auxiliary receiver 20 is selectively configured to operate in the single-mixer mode and comprises a mixer stage 90 operating at the carrier frequency.

In another configuration, the transmitter 16 is selectively configured to operate in the single-mixer mode and comprises a mixer stage 50 operating at the carrier frequency. The auxiliary receiver 20 is selectively configured to operate in the dual-mixer mixer and comprises a first mixer stage 90 operating at the carrier frequency minus an intermediate frequency, and a second mixer stage 104 operating at the intermediate frequency.

When the transmitter 16 is operating in the dual-mixer mode, this is advantageous when transmitting data at a high output power while fighting VCO pulling. However, if performance of the transmitter 16 begins to decline, then the transmitter may be selected to operate in the single-mixer mode while transmitting at low power. In this mode, the transmitter 16 may be recompensated if necessary so that the performance of the transmitter is improved.

If the auxiliary receiver 20 is operating in the dual-mixer mode, then this is advantageous for estimating the impairments created in the transmitter 16 and in the auxiliary receiver, which in turn may be used when compensating the transmitter or the auxiliary receiver. Once the impairments have been compensated in the auxiliary receiver 20, then the auxiliary receiver may advantageously be operated in the single-mixer mode.

As noted above, the performance module 25 is able to derive a SNR of the RF modulated signal based on the EVM. The following ratio provides the relationship between EVM and SNR:

$$SNR \approx \frac{1}{EVM^2}$$

The derived SNR can be used to predict the BER using a waterfall curve for the corresponding modulation or through a look up table containing entries that specify BER versus SNR. Computation of EVM for the transmitter 16 and receiver 20 is performed on-the-fly while the transmitter and receiver function normally. This is useful in assessing if the analog tuning exercised is effective in improving the overall performance of the transceiver 16.

There are several analog controls that are exercised to control offsets, IQ imbalance, group delay distortion and in-band droop. These are controlled by independent algorithms that are implemented in HW or SW or a combination of two. In addition, selection of the transmitter 16 between a single-mixer mode and a dual-mixer mode is another approach for tuning performance of the transmitter. In order for the receive impairment to be spectrally spaced from the transmit impairment in the receive baseband modulated signal, the auxiliary receiver 20 needs to operate in a mode that is different from the mode of the transmitter 16.

Although not illustrated, the mobile wireless communications device 10 may also include an auxiliary transmitter along with the auxiliary receiver 20. The auxiliary transmitter may be used for determining impairment compensation of the main receiver 18. The same principles discussed herein are equally applicable to the auxiliary transmitter and the main receiver 18, as readily appreciated by those skilled in the art. For example, the impairments created in the auxiliary transmitter can be separated from the impairments created in the main receiver 18.

EVM calculation will now be discussed. An error vector is a vector in the I-Q plane between the ideal constellation point and the point received by the receiver. In other words, it is the difference between actual received symbols and ideal symbols. The average power of the error vector, normalized to signal power, is the EVM. A transmitter 16 to auxiliary receiver 20 feedback link can be modeled as a basic AWGN channel. If the received signal is time aligned to the transmitted signal, the EVM is defined as:

$$EVM = \frac{\frac{1}{N}\sum_{n=1}^{N}|S_{RX,n} - S_{TX,n}|^2}{\frac{1}{N}\sum_{n=1}^{N}|S_{Tx,n}|^2}$$

where $s_{TX,n}$ and $S_{RX,n}$ represent the normalized nth transmitted and received symbols, respectively. This is calculated as $$EVM_{RMS} = \sqrt{\frac{\frac{1}{N}\sum_{n=1}^{N}[I_{RK} - I_{TX}]^2 + [Q_{RX} - T_{TX}]^2}{\frac{1}{N}\sum_{n=1}^{N}[I_{TX}^2 + Q_{TX}^2]}}$$

In the above equation, the received constellation is normalized to the received samples while the transmitted constellation is normalized to transmit samples. Therefore, the analog gain is taken out of the EVM estimate. The performance module 25 uses the error samples from an LMS algorithm as the error vector in the numerator of the EVM estimate after the algorithm has converged. This advantageously achieves elimination of the IQ imbalance, elimination of offsets from the received samples. In addition, the received constellation to the transmit constellation is matched such that the difference between the two (error vector) is minimum. Achieving normalization operations on receive samples is achieved through gain adjustment (i.e., determining $w_1$).

The average power of the transmit samples and the error vector are calculated separately. The two summations ($P_{error}$ and $P_{TX}$) are reported to the performance module 25, which in turn, estimates the EVM. Percent EVM can then be computed as:

$$EVM(\%) = \sqrt{\frac{P_{error}}{P_{TX}}} \times 100\%$$

If the LMS algorithm is reasonably converged and the average error and signal powers are computed over sufficiently large number of samples, the signal-to-noise ratio is approximated as:

$$SNR \approx \frac{1}{EVM^2}$$

The BER can be predicted as an appropriate Q-function based on the measured SNR. BER is traditionally computed on a communication link by demodulating the received samples and comparing the decisions to the transmitted samples. In this approach, the BER can be predicted by using a Q-function implemented with a lookup table combined with interpolation without the need for demodulation. In a radio transceiver, the SNR is a more useful metric compared to BER, which is more relevant to assessing the quality of a complete radio link. Using the SNR, the noise figure of the link can be checked to see if is reasonable. Any asymmetry in the noise power of I and Q errors also indicates imbalance that needs to be adjusted.

Figure 14:
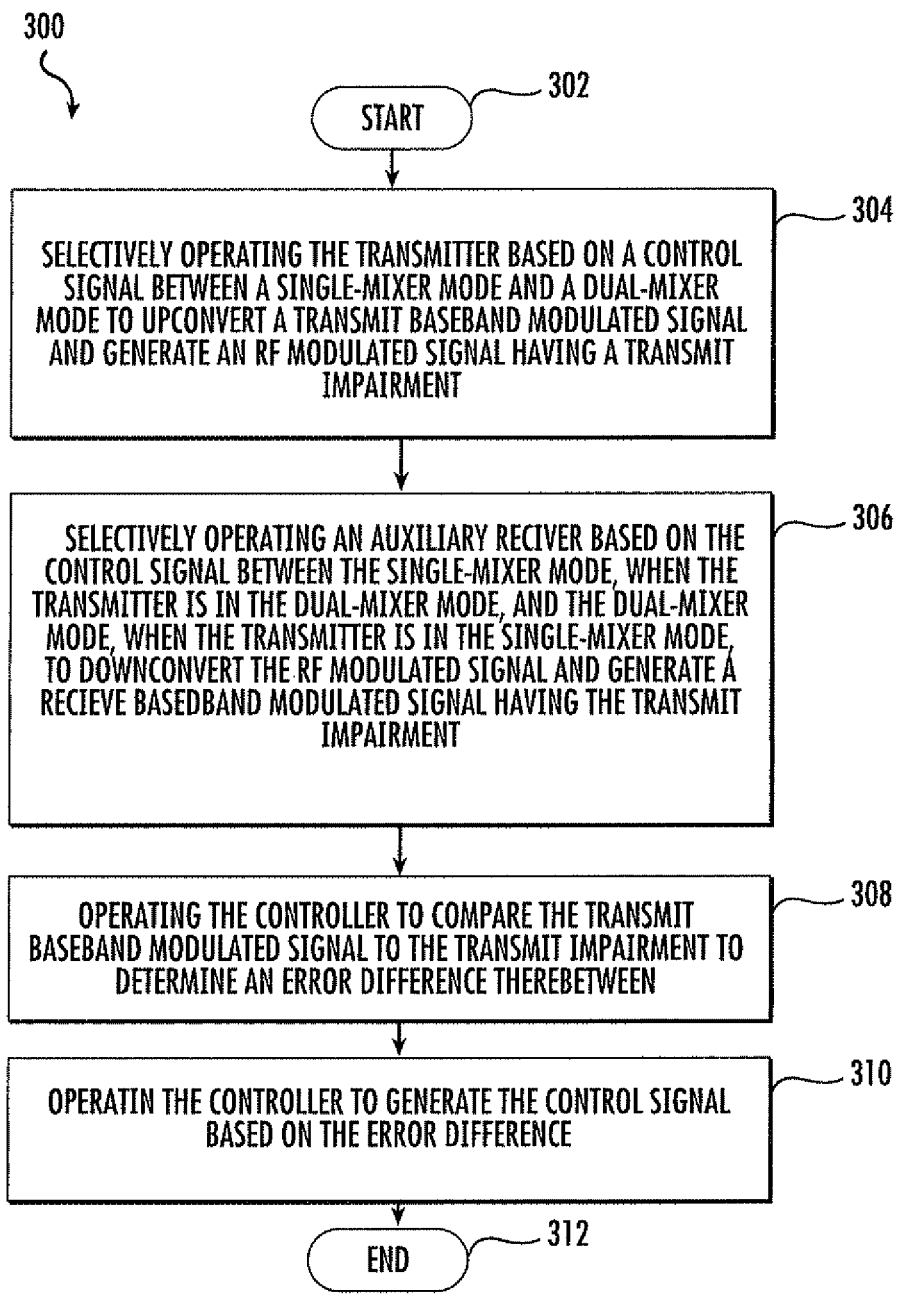
FIG. 14 is a flowchart illustrating a method for operating a mobile wireless communications device while taking into account performance evaluation in accordance with one exemplary aspect.

A flowchart 300 illustrating a method for operating a mobile wireless communications device 10 while taking into account performance evaluation will now be discussed in reference to FIG. 14. From the start (Block 302), the method comprises selectively operating the transmitter 16 at Block 304 based on a control signal between a single-mixer mode and a dual-mixer mode to upconvert a transmit baseband modulated signal, and generate an RF modulated signal having a transmit impairment. The auxiliary receiver 20 is selectively operated at Block 306 based on the control signal between the single-mixer mode, when the transmitter 16 is in the dual-mixer mode, and the dual-mixer mode, when the transmitter is in the single-mixer mode, to downconvert the RF modulated signal, and generate a receive baseband modulated signal having the transmit impairment. The method further comprises operating the controller 22 at Block 308 to compare the transmit baseband modulated signal to the transmit impairment to determine an error difference therebetween, and generate the control signal based on the error difference at Block 310. The method ends at Block 312.

Figure 15:
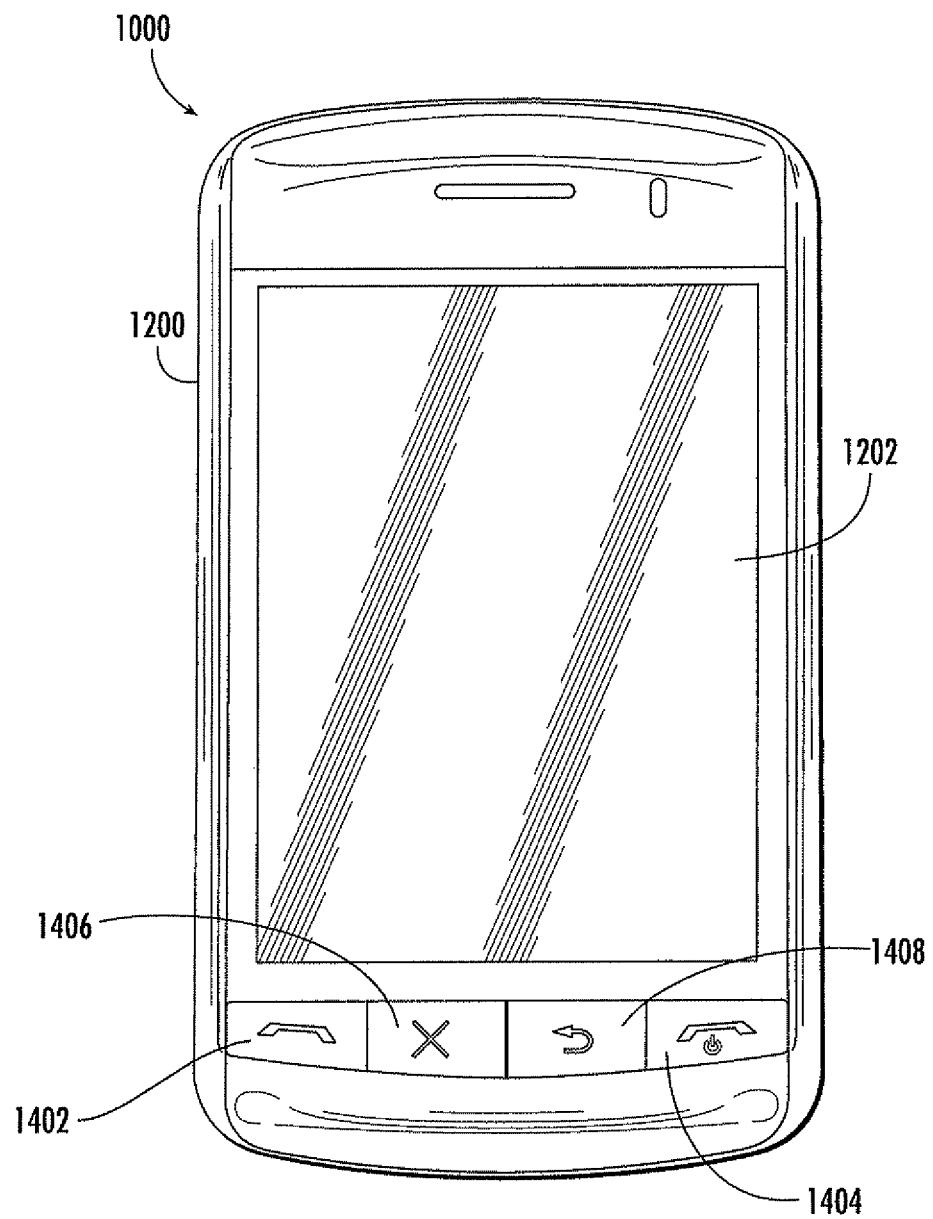
FIG. 15 is a front view of a mobile wireless communications device in accordance with another exemplary aspect.

Exemplary components that may be used in various embodiments of the above-described mobile wireless communications device are now described with reference to an exemplary mobile wireless communications device 1000 shown in FIGS. 15 and 16.

The mobile wireless communications device 1000 illustratively includes a portable housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. The keypad 1400 includes a plurality of control keys including an "off hook" (i.e., initiate phone call) key 1402, an "on hook" (i.e., discontinue phone call) key 1404, a menu key 1406, and a return or escape key 1408.

A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 16:
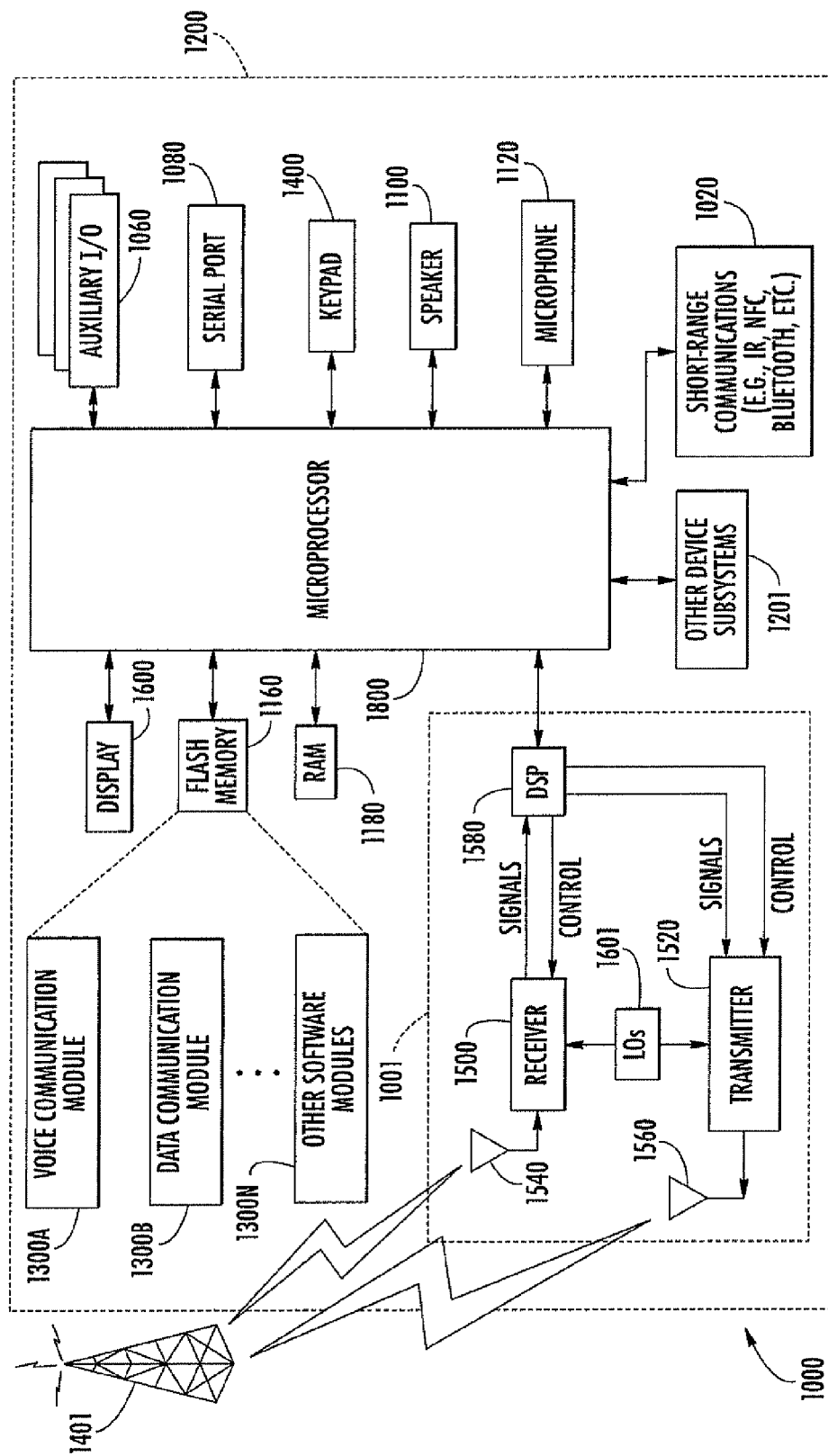
FIG. 16 is a schematic block diagram illustrating additional components that may be included in the mobile wireless communications device illustrated in FIG. 15.

In addition to the processing device 1800, other parts of the mobile device 1000 are shown schematically in FIG. 16. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 for networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the disclosure will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included as readily appreciated by those skilled in the art.

That which is claimed:

1. A mobile wireless communications device comprising:
a portable housing;
a transceiver comprising a transmitter and a receiver carried by said portable housing, said transmitter configured to be selectively operable based on a control signal between a single-mixer mode and a dual-mixer mode to upconvert a transmit baseband modulated signal and generate an RF modulated signal having a transmit impairment;
an auxiliary receiver carried by said portable housing and coupled to said transmitter and configured to be selectively operable based on the control signal between the single-mixer mode, when said transmitter is in the dual-mixer mode, and the dual-mixer mode, when said transmitter is in the single-mixer mode, to downconvert the RF modulated signal and generate a receive baseband modulated signal having the transmit impairment; and
a controller carried by said portable housing and coupled to said transmitter and said auxiliary receiver, said controller configured to
compare the transmit baseband modulated signal to the transmit impairment to determine an error difference therebetween, and
generate the control signal based on the error difference.

2. The wireless communications device according to claim 1 wherein the error difference corresponds to an error vector magnitude (EVM); and wherein said controller is configured to derive a signal-to-noise ratio (SNR) of the RF modulated signal based on the EVM.

3. The wireless communications device according to claim 2 wherein said controller is configured to estimate a bit error rate (BER) of the RF modulated signal based on the SNR.

4. The wireless communications device according to claim 1 wherein the RF modulated signal is generated at a carrier frequency; wherein said transmitter when operating in the dual-mixer mode comprises a first mixer stage operating at the carrier frequency minus an intermediate frequency, and a second mixer stage operating at the intermediate frequency; and wherein said auxiliary receiver when operating in the single-mixer mode comprises a mixer stage operating at the carrier frequency.

5. The wireless communications device according to claim 1 wherein the RF modulated signal is generated at a carrier frequency; wherein said transmitter when operating in the single-mixer mode comprises a mixer stage operating at the carrier frequency; and wherein said auxiliary receiver when operating in the dual-mixer comprises a first mixer stage operating at the carrier frequency minus an intermediate frequency, and a second mixer stage operating at the intermediate frequency.

6. The wireless communications device according to claim 1 wherein the receive baseband modulated signal has a receive impairment therein spectrally separated from the transmit impairment; and wherein said controller comprises a delay circuit configured to delay the transmit baseband modulated signal so that the transmit baseband modulated signal and the transmit impairment match up in time when compared.

7. The wireless communications device according to claim 6 wherein said transmitter comprises a transmit local oscillator operating at a first frequency, and said auxiliary receiver comprises a receive local oscillator operating at a second frequency offset from the first frequency.

8. The wireless communications device according to claim 1 wherein said controller is configured to perform the comparing and generating during operation of said transmitter while transmitting data.

9. The wireless communications device according to claim 1 wherein the transmit baseband modulated signal comprises an in-phase (I) component signal and a quadrature-phase (Q) component signal.

10. The wireless communications device according to claim 1 further comprising a non-directional coupler carried by said portable housing and coupled between said transceiver and said auxiliary receiver.

11. A mobile wireless communications device comprising:
a portable housing;
a transceiver comprising a transmitter and a receiver carried by said portable housing, said transmitter comprising a transmit local oscillator operating at a first frequency, and configured to be selectively operable based on a control signal between a single-mixer mode and a dual-mixer mode to upconvert a transmit baseband modulated signal comprising an in-phase (I) component signal and a quadrature-phase (Q) component signal, and generate an RF modulated signal having a transmit impairment;
an auxiliary receiver carried by said portable housing and coupled to said transmitter and comprising a receive local oscillator operating at a second frequency offset from the first frequency, and configured to be selectively operable based on the control signal between the single-mixer mode, when said transmitter is in the dual-mixer mode, and the dual-mixer mode, when said transmitter is in the single-mixer mode, to downconvert the RF modulated signal and generate a receive baseband modulated signal having the transmit impairment; and
a controller carried by said portable housing and coupled to said transmitter and said auxiliary receiver, said controller configured to
compare the transmit baseband modulated signal to the transmit impairment to determine an error vector magnitude (EVM), and
generate the control signal based on the EVM.

12. The wireless communications device according to claim 11 wherein said controller is configured to derive a signal-to-noise ratio (SNR) of the RF modulated signal based on the EVM.

13. The wireless communications device according to claim 12 wherein said controller is configured to estimate a bit error rate (BER) of the RF modulated signal based on the SNR.

14. The wireless communications device according to claim 11 wherein the RF modulated signal is generated at a carrier frequency; wherein said transmitter when operating in the dual-mixer mode comprises a first mixer stage operating at the carrier frequency minus an intermediate frequency, and a second mixer stage operating at the intermediate frequency; and wherein said auxiliary receiver when operating in the single-mixer mode comprises a mixer stage operating at the carrier frequency.

15. The wireless communications device according to claim 11 wherein the RF modulated signal is generated at a carrier frequency; wherein said transmitter when operating in the single-mixer mode comprises a mixer stage operating at the carrier frequency; and wherein said auxiliary receiver when operating in the dual-mixer comprises a first mixer stage operating at the carrier frequency minus an intermediate frequency, and a second mixer stage operating at the intermediate frequency.

16. The wireless communications device according to claim 11 wherein the receive baseband modulated signal has a receive impairment therein spectrally separated from the transmit impairment; and wherein said controller comprises a delay circuit configured to delay the transmit baseband modulated signal so that the transmit baseband modulated signal and the transmit impairment match up in time when compared.

17. The wireless communications device according to claim 11 wherein said controller is configured to perform the comparing and generating during operation of said transmitter while transmitting data.

18. A method for operating a mobile wireless communications device comprising a transceiver comprising a transmitter and a receiver, an auxiliary receiver coupled to the transmitter, and a controller coupled to the transmitter and the auxiliary receiver, the method comprising:
selectively operating the transmitter based on a control signal between a single-mixer mode and a dual-mixer mode to upconvert a transmit baseband modulated signal and generate an RF modulated signal having a transmit impairment;
selectively operating an auxiliary receiver based on the control signal between the single-mixer mode, when the transmitter is in the dual-mixer mode, and the dual-mixer mode, when the transmitter is in the single-mixer mode, to downconvert the RF modulated signal and generate a receive baseband modulated signal having the transmit impairment; and
operating the controller to
compare the transmit baseband modulated signal to the transmit impairment to determine an error difference therebetween, and
generate the control signal based on the error difference.

19. The method according to claim 18 wherein the error difference corresponds to an error vector magnitude (EVM); and wherein the controller derives a signal-to-noise ratio (SNR) of the RF modulated signal based on the EVM.

20. The method according to claim 19 wherein the controller estimates a bit error rate (BER) of the RF modulated signal based on the SNR.

21. The method according to claim 18 wherein the RF modulated signal is generated at a carrier frequency; wherein the transmitter when operating in the dual-mixer mode comprises a first mixer stage operating at the carrier frequency minus an intermediate frequency, and a second mixer stage operating at the intermediate frequency; and wherein the auxiliary receiver when operating in the single-mixer mode comprises a mixer stage operating at the carrier frequency.

22. The method according to claim 18 wherein the RF modulated signal is generated at a carrier frequency; wherein the transmitter when operating in the single-mixer mode comprises a mixer stage operating at the carrier frequency; and wherein the auxiliary receiver when operating in the dual-mixer comprises a first mixer stage operating at the carrier frequency minus an intermediate frequency, and a second mixer stage operating at the intermediate frequency.

23. The method according to claim 18 wherein the receive baseband modulated signal has a receive impairment therein spectrally separated from the transmit impairment; and wherein the controller delays the transmit baseband modulated signal so that the transmit baseband modulated signal and the transmit impairment match up in time when compared.

24. The method according to claim 22 wherein the transmitter comprises a transmit local oscillator operating at a first frequency, and the auxiliary receiver comprises a receive local oscillator operating at a second frequency offset from the first frequency.

25. The method according to claim 18 wherein the controller is configured to perform the comparing and generating during operation of the transmitter while transmitting data.

26. The method according to claim 18 wherein the transmit baseband modulated signal comprises an in-phase (I) component signal and a quadrature-phase (Q) component signal.

* * * * *